(12) United States Patent
Sattler et al.

(10) Patent No.: US 8,108,794 B2
(45) Date of Patent: Jan. 31, 2012

(54) METHOD AND APPARATUS FOR SUPPORTING CONTEXT LINKS FOR APPLICATION PROGRAM TEXT

(75) Inventors: Juergen Sattler, Wiesloch (DE); Hilmar Demant, Karlsdorf (DE); Joachim Gaffga, Wiesloch (DE)

(73) Assignee: SAP AG, Walldorf (DE)

( * ) Notice: Subject to any disclaimer, the term of this patent is extended or adjusted under 35 U.S.C. 154(b) by 679 days.

(21) Appl. No.: 12/106,651

(22) Filed: Apr. 21, 2008

(65) Prior Publication Data

US 2008/0243849 A1 Oct. 2, 2008

Related U.S. Application Data

(62) Division of application No. 10/896,971, filed on Jul. 23, 2004, now abandoned.

(60) Provisional application No. 60/588,397, filed on Jul. 16, 2004.

(51) Int. Cl.
*G06F 3/00* (2006.01)

(52) U.S. Cl. .................. 715/808; 717/143; 715/712

(58) Field of Classification Search .................. 715/712, 715/808; 717/143
See application file for complete search history.

(56) References Cited

U.S. PATENT DOCUMENTS

| | | | |
|---|---|---|---|
| 7,634,732 B1 * | 12/2009 | Blagsvedt et al. | 715/712 |
| 7,770,102 B1 * | 8/2010 | Wolff et al. | 715/234 |
| 2001/0042063 A1 * | 11/2001 | Ebert | 707/3 |
| 2003/0101413 A1 * | 5/2003 | Klein et al. | 715/513 |
| 2005/0198563 A1 * | 9/2005 | Kristjansson | 715/507 |
| 2005/0273452 A1 * | 12/2005 | Molloy et al. | 707/1 |
| 2005/0278332 A1 * | 12/2005 | Petev et al. | 707/8 |

* cited by examiner

*Primary Examiner* — Mahesh Dwivedi
(74) *Attorney, Agent, or Firm* — Kenyon & Kenyon LLP (57) ABSTRACT

Methods and apparatus are provided for supporting text-based context links for application programs. An embodiment includes a first computer to maintain a database of data objects and a second computer to execute an application program that operates on a file having text elements. In an embodiment, the second computer is to execute a link program to access a data object on the first computer based on a user of the application program having used the application program to select a text element that is related to that data object.

25 Claims, 9 Drawing Sheets

METHOD AND APPARATUS FOR SUPPORTING CONTEXT LINKS FOR APPLICATION PROGRAM TEXT

CROSS-REFERENCE TO RELATED APPLICATIONS

This is a divisional of application Ser. No. 10/896,971, filed Jul. 23, 2004, now abandoned the content of which is incorporated herein by reference. This application claims the benefit of priority afforded by provisional application Ser. No. 60/588,397, filed Jul. 16, 2004.

BACKGROUND OF THE INVENTION

An application program may be used to perform operations on a document that contains textual elements that relate to data objects, such as such as for example an order, business partner, quotation, or invoice. A textual element is a string of characters that is typically deliminated by a separator, such as a space or the end of a field. Some examples of text elements are a word, a number, or a phrase. A data object is an item of data that is associated with one or more functions (i.e., operations) that may be performed with that data. One type of data object is a "business object," which would concern a commercial matter. In the case of the data object "order," for example, a user may be able to command a computer system to perform functions with the order such as creating a new order, checking the order status, canceling the order, shipping a product that was ordered, displaying information for an order, displaying a list of data objects that are related to the order, etc.

An application program may include "context links" that associate such text elements within a document with functions related to those text elements so that a user may access the functions by selecting the text elements. For example, a word processor may be used to process a document that contains a plurality of words, and one or more individual words may by highlighted to indicate that there is a context link for these words. If in this example one of the words is a person's name that is highlighted to indicate the presence of a context link for that name (e.g., because that person is an employee), by clicking on this name a user may cause the display of accessible functions that are associated with that person, such the ability to invoke an email program to create an email message that is addressed to the person.

DETAILED DESCRIPTION

Embodiments of the present invention provide methods and apparatus for supporting text-based context links for application programs. According to embodiments, data objects and functionality in a back-end system may be used to efficiently create context links in a front-end system. These context links may be used to access the related data objects by, for example, displaying information related to the data object or performing functions on the data object.

Figure 1:
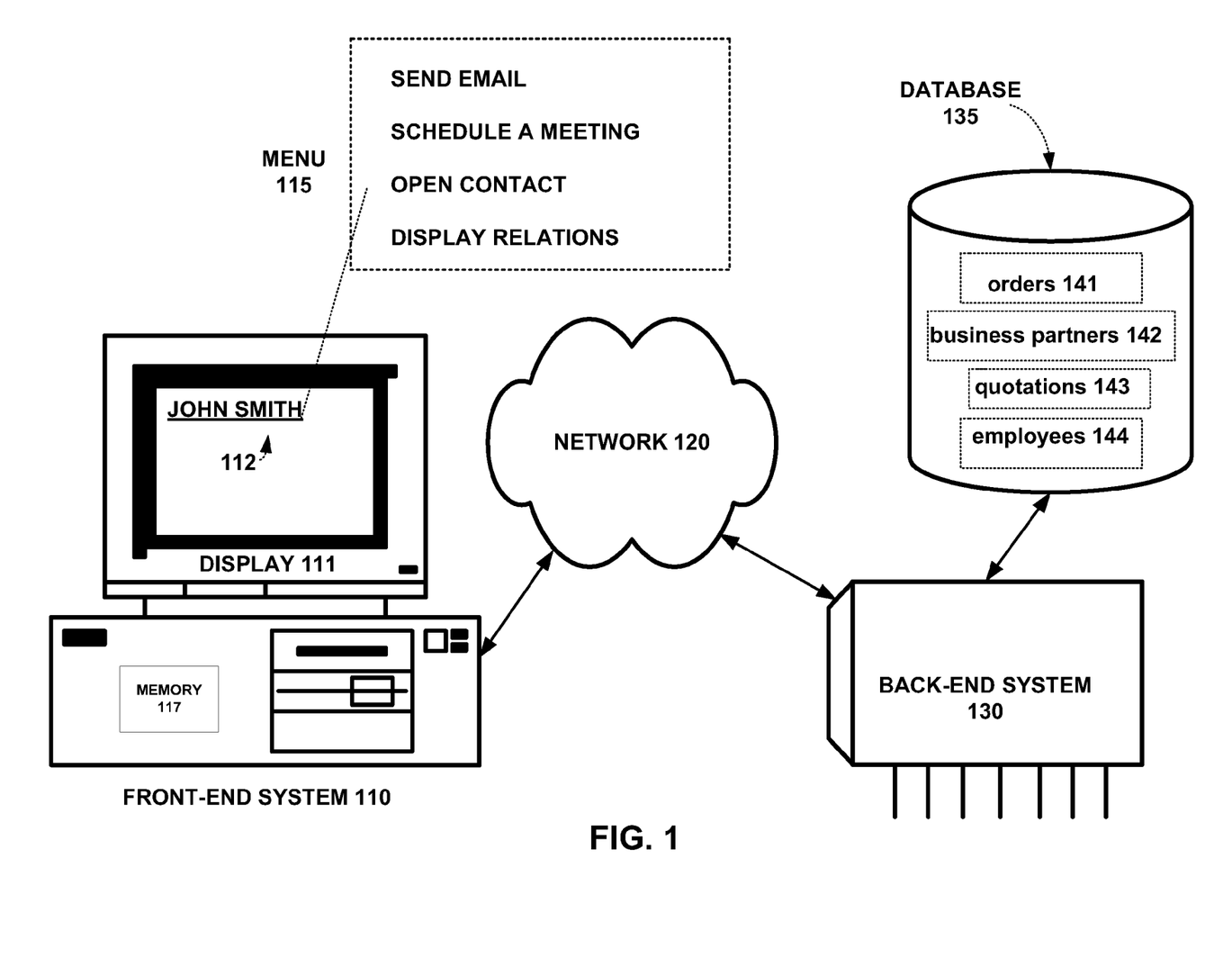
FIG. 1 is a simplified block diagram that illustrates a front-end computer system that supports access from text element context links in the front-end computer system to data objects in a back-end computer system according to an embodiment of the present invention.

FIG. 1 is a simplified block diagram that illustrates a front-end computer system that supports access from text element context links in a front-end computer system to data objects in a back-end computer system. FIG. 1 shows a front-end system 110, a network 120, a back-end system 130 and a database 135. Front-end system 110 may be any type of device for running application software, such as for example a personal computer, a terminal, a personal digital assistant (PDA), etc. Network 120 may be any type of network for communicating information, such as a local area network (LAN), wide area network (WAN), the Internet, or an intranet. Back-end system 130 may be a terminal server, mainframe computer, or any type of computer system that services users over network 120. Typically, many front-end systems may be coupled to back-end system 130 through network 120. As shown, back-end system 130 is coupled to database 135, which may be any type of computer readable medium, such as one or more hard disk memories, that stores instructions and data for an enterprise resource planning system that maintains a collection of data to supports a decision making process. Database 135 may contain a plurality of data objects, which are shown for example as order 141, business partner 142, quotation 143, and invoice 144, that are maintained by back-end system 130 in that back-end system 130 may perform functions on these data objects.

As shown in FIG. 1, front-end system 110 is displaying the text "John Smith", which may be text in a file that is currently being operated on by an application program such as a word processor. Front-end system 110 also contains a memory 117, which may be for example a Random Access Memory (RAM). In FIG. 1, the text "John Smith" being operated on by front-end system 110 is shown as linked to a menu 115, which contains the actions "SEND EMAIL", "SCHEDULE A MEETING", "OPEN CONTACT", and "DISPLAY RELATIONS".

Figure 2:
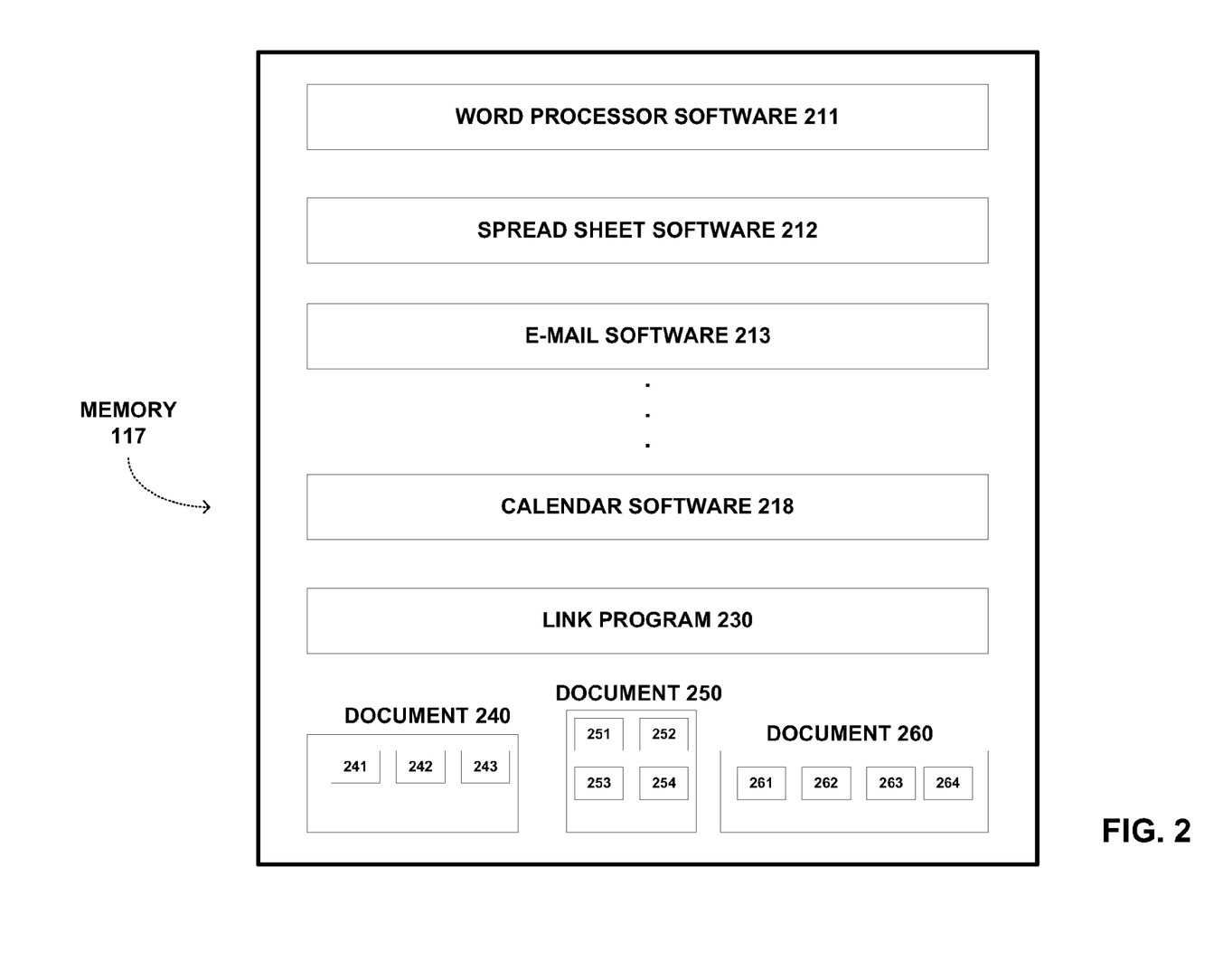
FIG. 2 is a simplified block diagram that illustrates programs stored in a memory of a front-end computer system for supporting context links according to an embodiment of the present invention.

FIG. 2 is a simplified block diagram that illustrates programs stored in a memory of a front-end computer system for supporting context links according to an embodiment of the present invention. FIG. 2 shows programs stored in memory 117. Memory 117 may store a plurality of application programs 211-218 that may be running on front-end system 110. As shown in FIG. 2, memory 117 stores a word processor software 211, spread sheet software 212, email software 213, and calendar software 218, but of course memory 117 may store any other programs that may be running on front-end system 110. As shown in FIG. 2, memory 117 also stores a plurality of documents 240-260, each of which may be documents that are operated on by application programs 211-218. Each of the documents are shown as including a plurality of text elements 241-243, 251-254, and 261-264, which may be words or phrases in documents 240 to 260. Memory 117 is also shown as storing a link program 230 which may be executed by the front-end system to support context links between text elements in front-end system 110 and data objects in back-end system 130 according to an embodiment of the present invention.

In an embodiment, and as shown in FIG. 1, front-end system 110 may be adapted to execute one or more application programs (such as programs 211-218) that perform operations on documents containing text elements (such as documents 240-260). Back-end system 130 may maintain a database 135 that associates one or more text elements in the front-end system's documents, such as "JOHN SMITH 112", with objects and/or functions. In this embodiment, front-end system 110 may determine whether there is an association between the text elements and any data objects by using link program 230, such in a Dynamic Link Library file, that is stored on the front-end system and that may maintain lists to store or buffer the text content. Such a link program may be a software program that supports context links. If front-end system 110 determines that there is an association between the text element and a data object, because the text element was found once in the back-end system, the front-end system may create a context link for that text element. For example, if a search by back-end system 130 of its associated database reveals that a certain text element in a document is of the type customer name, front-end system 110 may then create a context link that allows a user to access a data object for that customer by selecting that text element in the document. After a text element or sequence of text elements have been associated with a text element or object type, a user will be able to choose from a menu of related actions (i.e., functions) by selecting that text element.

Text elements may be associated with one or more types of context links, such as a customer context link and an employee context link, and context link type may correspond to a type of business object. In an embodiment, a business object/ context link type may have relationships with other business objects/ context link types, and such relationships may be displayed to the user as a separate structure such as, for example, a tree. Thus, a business partner type of object may be related to an invoice or a quotation type of object.

In order to obtain any information regarding associations between text elements and objects/functions, front-end system 110 may send the text element to back-end system 130, which may initiate a query for the text element. Based on the results that are returned from back-end system 130, front-end system 110 may store a record, for example using a Dynamic Link Library, of any associations between the text element and the functions that may be executed for that text element. Such a record may contain the results of the query, and may include the number of times the text element is found for each context link type and a data object identifier. In an embodiment, a single Dynamic Link Library is used to access and support any context links associating data objects with text elements in any application program documents on the front-end system, regardless of the type of text element (e.g., customer name, employee name, phone number, etc.), type of functions, or type of documents (e.g., word processor formatted document, spread sheet, etc.). Such an access may be, for example, initiating a function on the data object or displaying data that is related to the data object. In an embodiment, one Dynamic Link Library is used to support all data object types regardless of whether the data objects are currently known to the front-end system or are later declared in the back-end system. In an embodiment, front-end system 110 buffers records of associations (context links) for those front-end system program text elements that have functions on back-end system 130.

In an embodiment, a single link program on front-end system 110, such as link program 230, may be used to handle all context link related communications with back-end system 130. The configuration information for the dynamic links may be created with each initialization of the link program, as discussed below with reference to FIG. 3. In an embodiment, back-end system 130 contains business logic, such as actions which can be executed for a specific context link (e.g., the action "create order" for a text element of the type customer). Thus, back-end system 130 may contain any software that is used to execute a function on a business object. In an embodiment, front-end system 110 does not contain any business logic, and the recognition function as well as the computing that supports actions taken on the object may be performed by back-end system 130.

Figure 3:
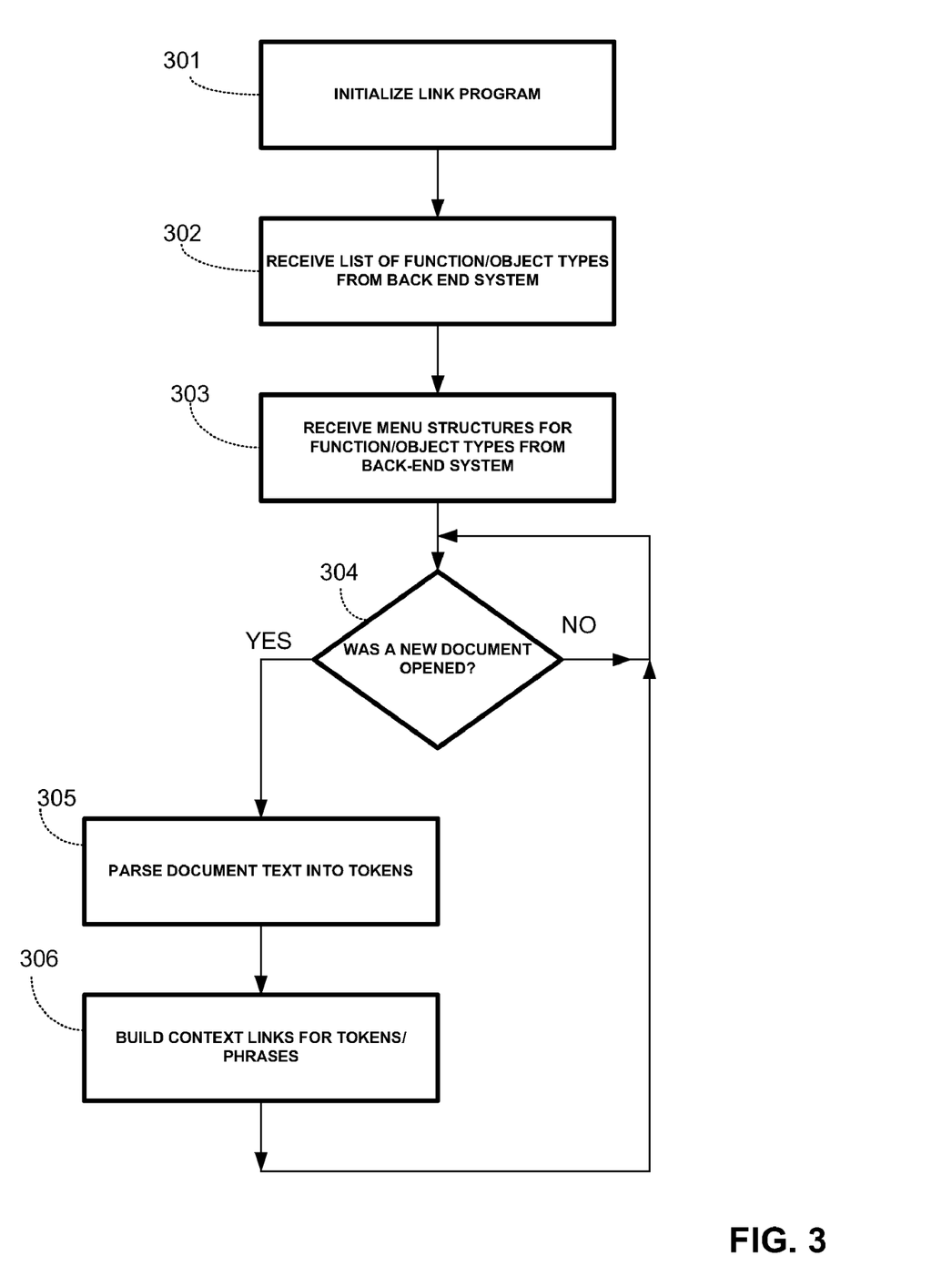
FIG. 3 is a flow diagram that illustrates a method for creating context links in a front-end system between application program text elements and objects/functions according to an embodiment of the present invention.

FIG. 3 is a flow diagram that illustrates a method for creating context links in a front-end system between application program text elements and objects/functions according to an embodiment of the present invention. This method may be performed, for example, after the front-end system is rebooted. The first time that the front-end system initiates an application program, the front-end system may initialize a link program (301), which causes a request to be sent to the back-end system for a list of object/function types that are stored on the back-end system (302). In addition to object/function types, according to one embodiment back-end system 130 may also return to the front-end system a menu structure (303), that later may be populated with information from documents stored on the front-end system, based on a parameter conversion. In an embodiment, the menu structure is received only if textual information to be displayed with the menu is not available at that time. After an application program on front-end system 110 opens a new document (304), that application program may parse the document text into tokens (305), which may be for example words in a word-processing document. Front-end system 110 may then build context links for the document (306), for example as discussed with reference to FIG. 4-6 below. If new text is later added to a document, such as when a user types in a new word into a word processor document, a search as discussed below may be performed for the new word to determine if a context link should be created.

Figure 4:
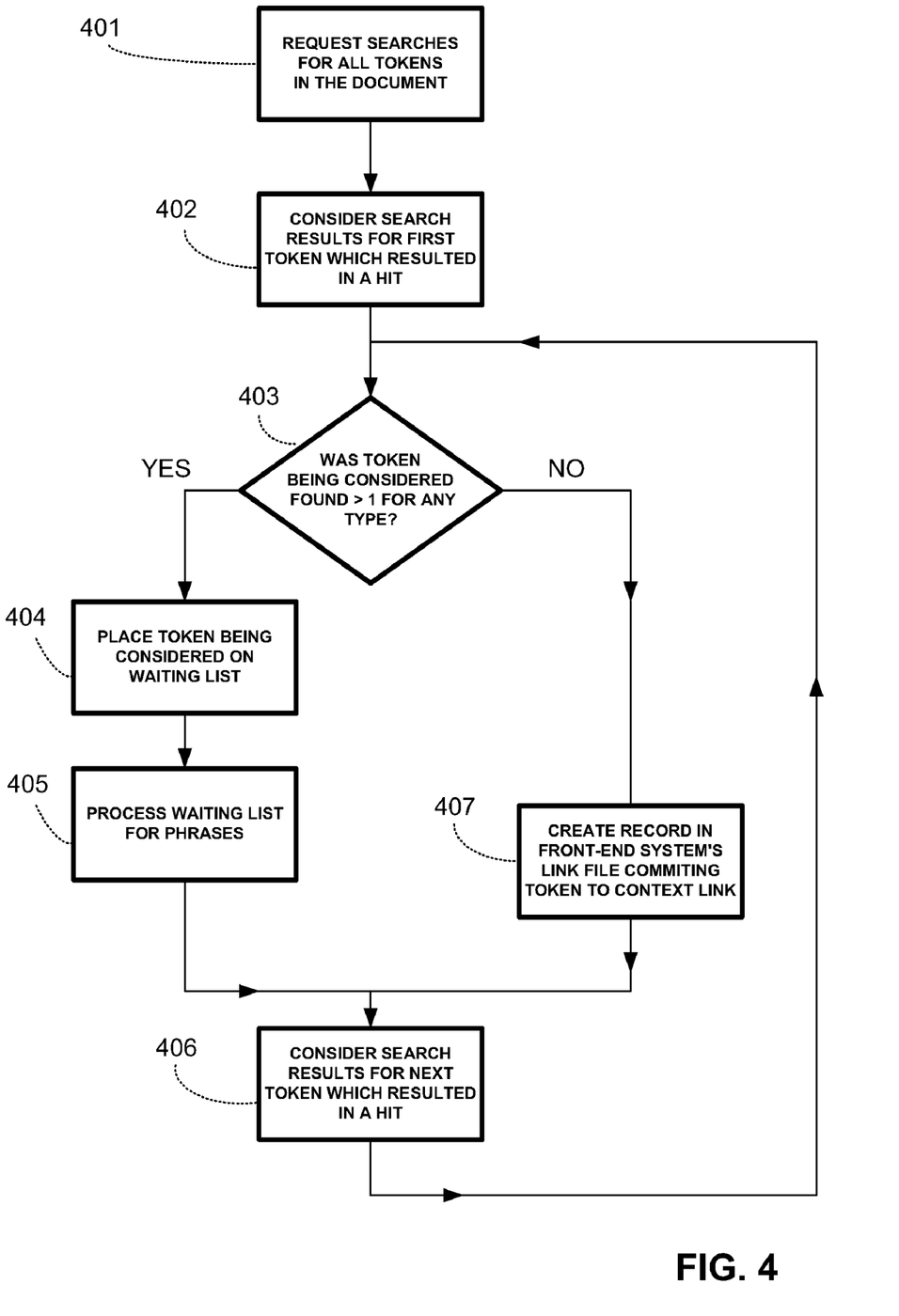
FIG. 4 is a flow diagram that illustrates a method of building context links according to an embodiment of the present invention.
Figure 5:
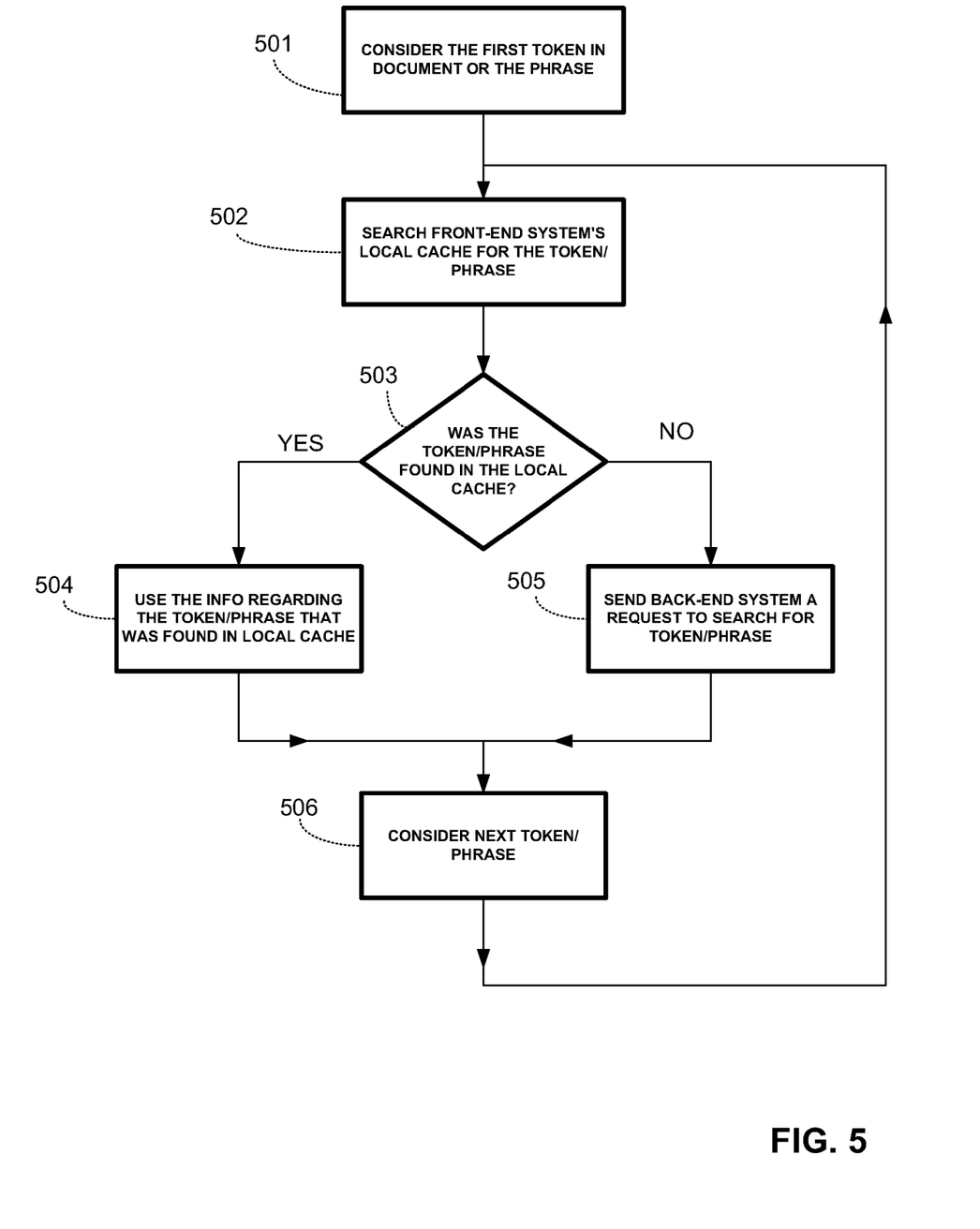
FIG. 5 is a flow diagram that illustrates a method of searching for tokens or phrases according to an embodiment of the present invention.

FIG. 4 is a flow diagram that illustrates a method of building context links according to an embodiment of the present invention. In an embodiment, the front-end system 110 may request searches for all tokens in the document (401), for example as shown in FIG. 5. Front-end system 110 may store information on the result of the searches in a buffer for later analysis, as discussed below, for each token that was found in one or more of the back-end searches. Each time a token is found, the results of the search may specify the type of function with which the text element is associated, and the buffer may contain different lists or queues for each type of function. Front-end system 110 may then consider the search results for the first token in the document which resulted in a hit (i.e., the token was found) (402). If a token is found exactly once by back-end system 130 for a particular token type, then a context link entry may be created in a file for that text element (407). If a token/text element results in a one hit for two or more types, two context links may be created for that token/text element. In such a case, a menu of functions for each of the object types may be displayed as cascading menus. For example, if "John Smith" is a customer and an employee, a customer context link and an employee context link may be created and displayed as cascading menus for the text element "John Smith." The search results for the next token may then be considered (406), and this process may be repeated. If the token being considered was found more than once for any token type (403), then that token is placed on a waiting list for that type (404) and the waiting list is processed for phrases as discussed below in FIG. 6. The search results for the next token may then be considered (406), and this process may be repeated for each token in the document.

For example, the token "Dave" may be found by the back-end system one hundred times as a "customer" name and fifty times as an "employee" name. In an embodiment, the method discussed above may continue by combining into phrases any tokens that appear consecutively in the document and that each result in more than one hit for a type in the back-end system searches. In this embodiment, a token may result as two hits in a back-end system search if the token is found once in the back-end system as a single word and a second time as part of a phrase that includes that word. In an alternative embodiment, a context link may be created for a phrase if one of the works in the phrase results in a unique hit. As discussed below with reference to FIG. 6, the front-end system may request a search for each phrase and, based on the results received from the back-end system, the front-end system may store information for phrases that are found in one or more of these back-end searches. If a phrase is found more than once for a token type, the front-end system may use this phrase to create modified phrases and may repeat the process discussed above by requesting that the back-end system perform a search for these modified phrases. For example, if a word (e.g., "Dave") is found as employee type token with ten hits, and thus may stay in an employee-queue, and the next word in the document (e.g., "Smith") is also found as employee with fifty hits, then these two words may be combined and sent to the backend system to get a result for this combination of two words of one type. Continuing this example, if the phrase ("Dave Smith") is found more than once, and the next word (e.g., "Jr.") is also found as an employee type, a search may be requested for the combined phrase ("Dave Smith, Jr.") as an employee. The queue mechanism for the combined tokens may be used for each supported context link type, such as customer, employee or reseller, with a different queue or list for each supported type.

FIG. 5 is a flow diagram that illustrates a method of searching for tokens or phrases according to an embodiment of the present invention. The method shown in FIG. 5 may be used to search for a token or for a phrase (i.e., a combination of tokens). In this embodiment, the front-end system 110 has a memory that stores (or caches) the results of searches for tokens or phrases. According to the method shown, the first token in the document or the first phrase is considered (501) and a search is made for that token or phrase in the front-end system's local cache (502). If the token or phrase was found in the local cache (503), in which case a search for this token or phrase was done before and that search resulted in a hit, then the information regarding that token or phrase is used (504). If the token or phrase was not found in the local cache (503), then the front-end system sends the back-end system a request for the token or phrase (505). The back-end system may perform such a search on a set of data that is cached in a memory and thus minimize access to databases on the back-end system. The next token or phrase is then considered (506).

Figure 6:
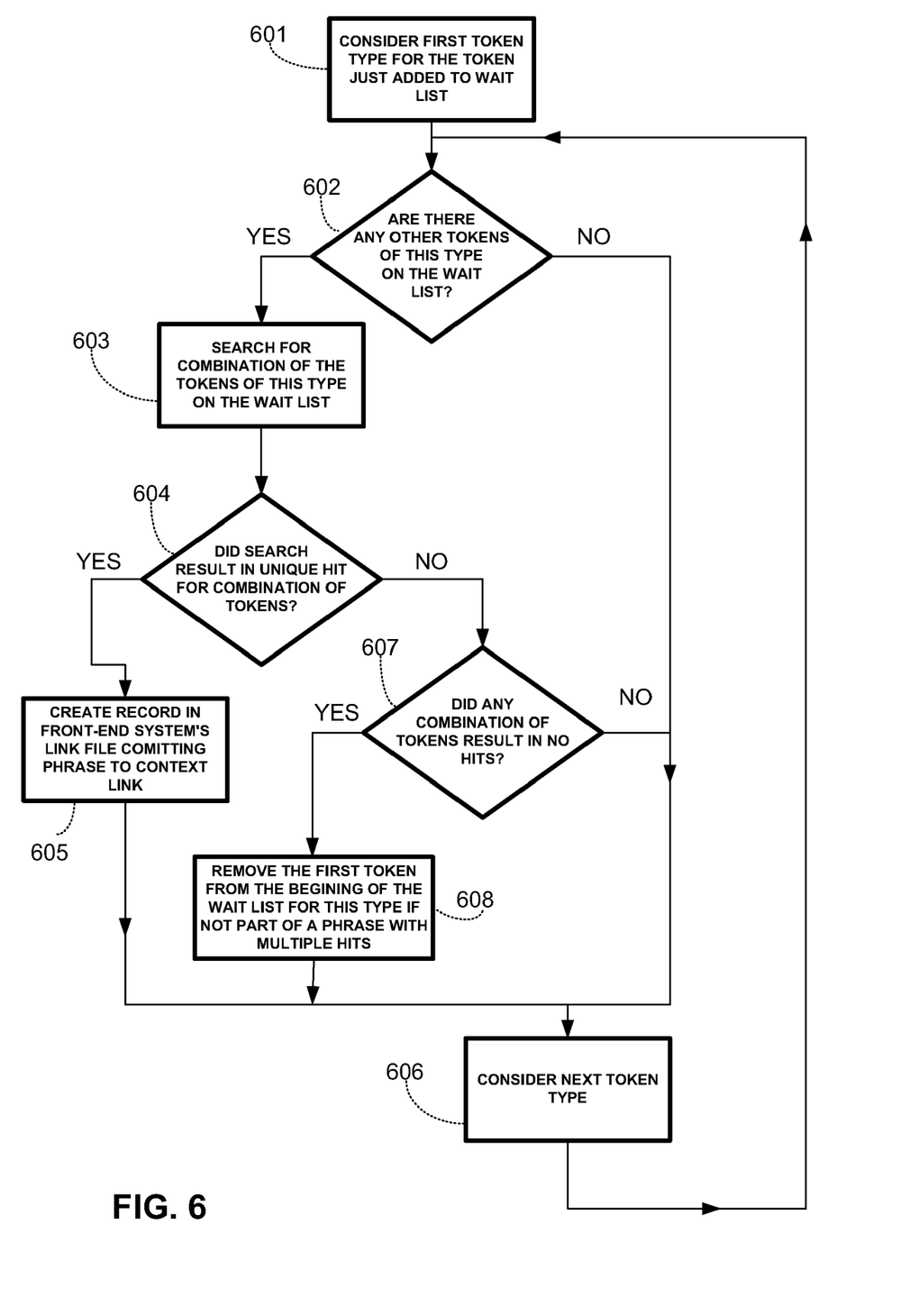
FIG. 6 is a flow diagram that illustrates a method of processing tokens to determine if a phrase is found according to an embodiment of the present invention.

FIG. 6 is a flow diagram that illustrates a method of processing tokens to determine if a phrase is found according to an embodiment of the present invention. This method is performed for waiting lists which contain tokens that have resulted in more than one hit for a particular token type. There may be one waiting list maintained for each token type. The tokens may be placed on the waiting list in the order as they are found in the document being processed and may be removed from the waiting list if it is determined that the token is not part of a phrase for which a context link is to be created. The method shown in FIG. 6 may be performed after a token was just added to the waiting list, and this token may result in a hit for a single type or multiple types. As discussed above with reference to FIG. 4, if a token was added to the waiting list, the token resulted in multiple hits for at least one type. According to the method shown, a first token type for the token just added to the waiting list is considered (601). If there are no other tokens of this type in the waiting list (602), the next token type is considered (606). If there are other tokens in the waiting list of this token type (602), a search is made for a combination of tokens of this type in the waiting list (603). This search may be performed according to the method shown in FIG. 5. Searches may be performed for multiple possible combinations starting with the last token on the waiting list and adding prior tokens on the waiting list. For example, a search may be made for all the tokens on the waiting list for this type, all the tokens on the waiting list for this type except for the first token, all the tokens on the waiting list for this type except for the first and second token, etc. If a search for a phase resulted in a unique hit for a combination of tokens (604), a record may be created in the front-end system's link file committing the phrase to a context link (605). If a search for a phase did not result in a unique hit for a combination of tokens (604), and the search for that phrase resulted in no hits (607), the first token in this phrase is removed from the beginning of the wait list for this type (608), because that token was not part of a phrase with multiple hits. The next token type is then considered (606).

In an embodiment, each user is assigned an authorization level that provides for access to each type of business object that is maintained by the back-end system. For example, a particular user may be in the human resources department and, thus, may not have authorization to read, modify, or create a customer type business object. In a further embodiment, the method of searching in the back-end system database for a token limits searches based on the authorization level of the user. For example, if a set of context links is being created for a particular user who does not have certain authorizations for an object or set of objects, then the system may not search the back-end system for such objects.

In an embodiment, a function associated with a text element in a document may require one or more parameters. For example, where the text element is an employee name type of object, after a user selects (e.g., click on) that name, the front-end system may display a menu of functions/actions for that context link, which may include sending an email to the employee. The parameter for these functions may be different from, although based upon, the text element associated the context link. In the example above, the employee name may be "John Smith," and the parameter "JohnSmith@ourcompany.com" may be passed to the back-end system along with the function send an email. In an embodiment, such parameters are not binded against a specific object at runtime in that is not known in advance what object will be identified as a context link. In an embodiment, during an initiation process the front-end system will retrieve configuration data about menus and other related items from the backend system, such as supported context link types and the menu and actions related to these types.

In an embodiment, a general interface is used to send a request for configuration data from the front-end system to the back-end system in that the same backend-method is always called to retrieve the initialization data / configuration data. When a new document is opened, the document may be parsed for tokens and context links may be identified and recorded as discussed above. In an embodiment, the tokens, phrases and their hits are stored in the buffer at the front-end system until the last application program is closed or the system is shut down. In a further embodiment, a context link cache is kept in memory at the front-end system so long as an application is open for which context link supports is being provided, and the context link information itself may be stored in the document. Thus, even if a document is closed and then opened again, the document will not have to be parsed a second time for context links. In this case, when a document is opened a second time, the user will see each previously recognized context links.

If a user selects (e.g., clicks on) text having a context link, which will active a menu that is displayed for this context link, the front-end system may determine if there are parameters to convert as menu text or menu-action (e.g., a "url") for any of the menu items that are to be display. If there any parameters to be converted, than the back-end systems may be called to lookup the parameter (or a synonym attribute) for the recognized object. For example, in the configuration data, a menu text may be "Send an email to &FirstName& &LastName& . . . " and a menu action may be "mailto:&EmailAddress&". If the text "John Smith" is recognized as an employee-object (which supports context links) then the text in the menu may appear at runtime as "Send an email to John Smith" and the Action "Url" may appear as mailto:John.Smith@ourcompany.com.

In an embodiment, the front-end system also provides attachment services such that a document may be stored on the back-end system and a logical relationship may be created between that document and the data object. For example, a letter that was written to a customer using a word processor may be attached to a context link in another document format, such that when a user of the other document selects that context link, the letter will be opened in the word processor so that the user can operate the word processor on that letter.

Figure 7:
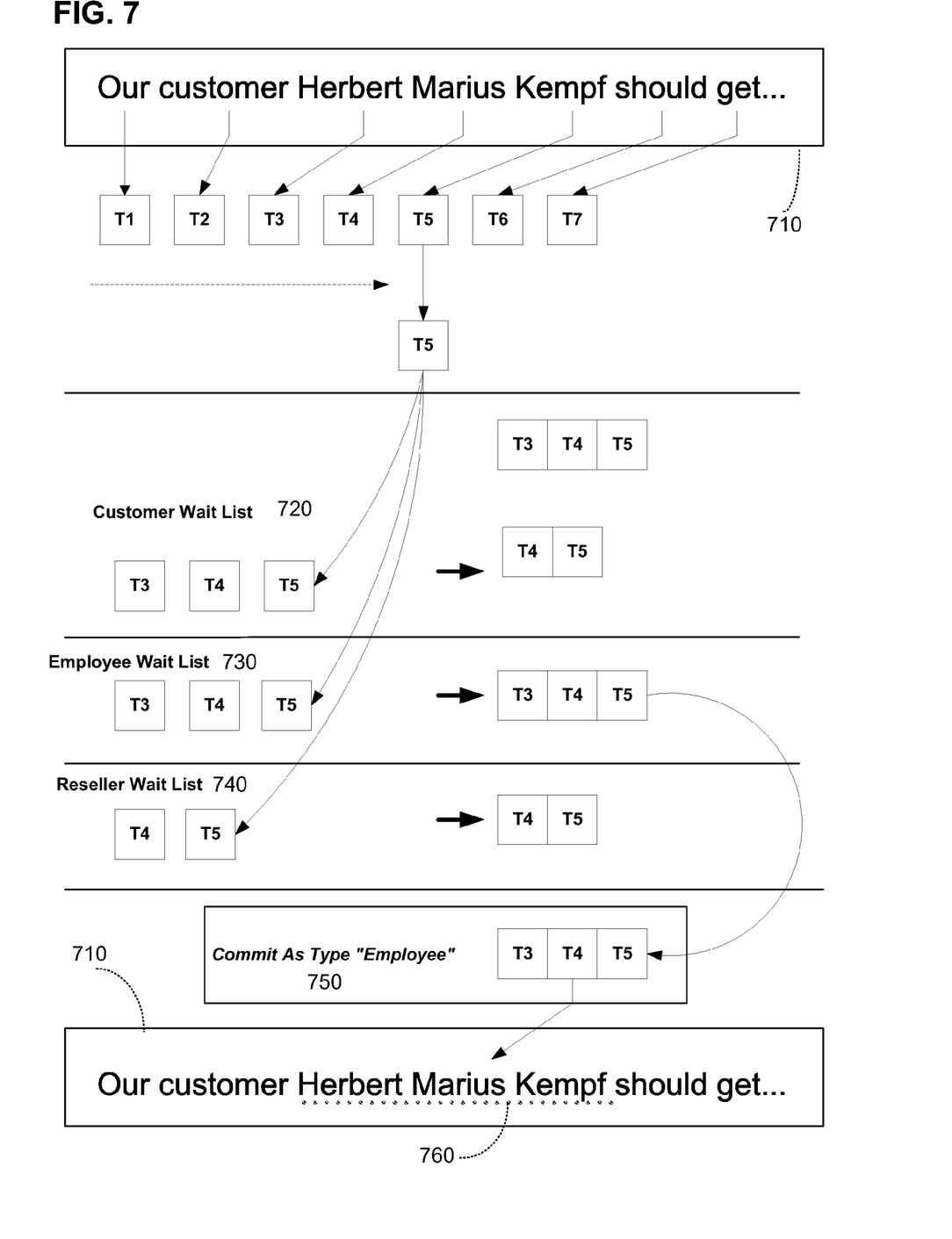
FIG. 7 is a simplified block diagram that shows an example of building phrases for a context link according to an embodiment of the present invention.

FIG. 7 is a simplified block diagram that illustrates an example of building phrases for a context link according to an embodiment of the present invention. FIG. 7 shows a string of text 710 from a document that is being operated on by an application program, such as a work processor. FIG. 7 also shows three token waiting lists, Customer List 720, Employee List 730, and Reseller List 740. Each of these waiting lists corresponds to a different type of data object. These waitlists may be used to keep track of tokens that are being considered as a part of a phrase. FIG. 7 also shows a committed phrase 750 and the text 710 as it has been highlighted at a later time to show that presence of a context link to a phrase.

As shown in FIG. 7, the string of text 710 may be parsed into text elements or tokens T1 to T7, each of which may represent an individual word. The method of building phrases may iterate through the tokens starting from left to right, as when reading an English language document. In the example shown in FIG. 5, the front-end system may be currently be considering whether the token T5 (here, the word "Kempf") is part of a phrase as found on the back-end system. The front-end system may have previously placed the tokens T3 and T4 on the customer wait list 720, T3 and T4 on the employee wait list 730, and T4 on the reseller wait list 740 because these tokens resulted in more than one hit for these data object types. After adding the token T5 to each of these wait lists, the front-end system will send the back-end system a request to search for the phrase T3/T4/T5 for the customer data object type, T3/T4/T5 for the employee data object type, and T4/T5 for the reseller data object type. In this example, if the phrase T3/T4/T5 is found more than once for the customer data object type, then the token T5 will be left on the list and the next token T6 will be processed. Similarly, if the phrase T4/T5 is found more than once for the reseller data object type, then the token T5 will be left on the list and the next token T6 will be processed. If as shown in this example the phrase T3/T4/T5 is found only once for the employee data object type, then the phrase T3/T4/T5 will be committed as a context link as a committed phase 750, and this context link will be highlighted (for example, by underlining) as context link 760 in text 710. Thus, in this example, the phrase "Herbert Marious Kempf" will have been found only once as an employee type data object in the back end system, and a context link is created from the text element "Herbert Marious Kempf" is created to that data object.

Figure 8:
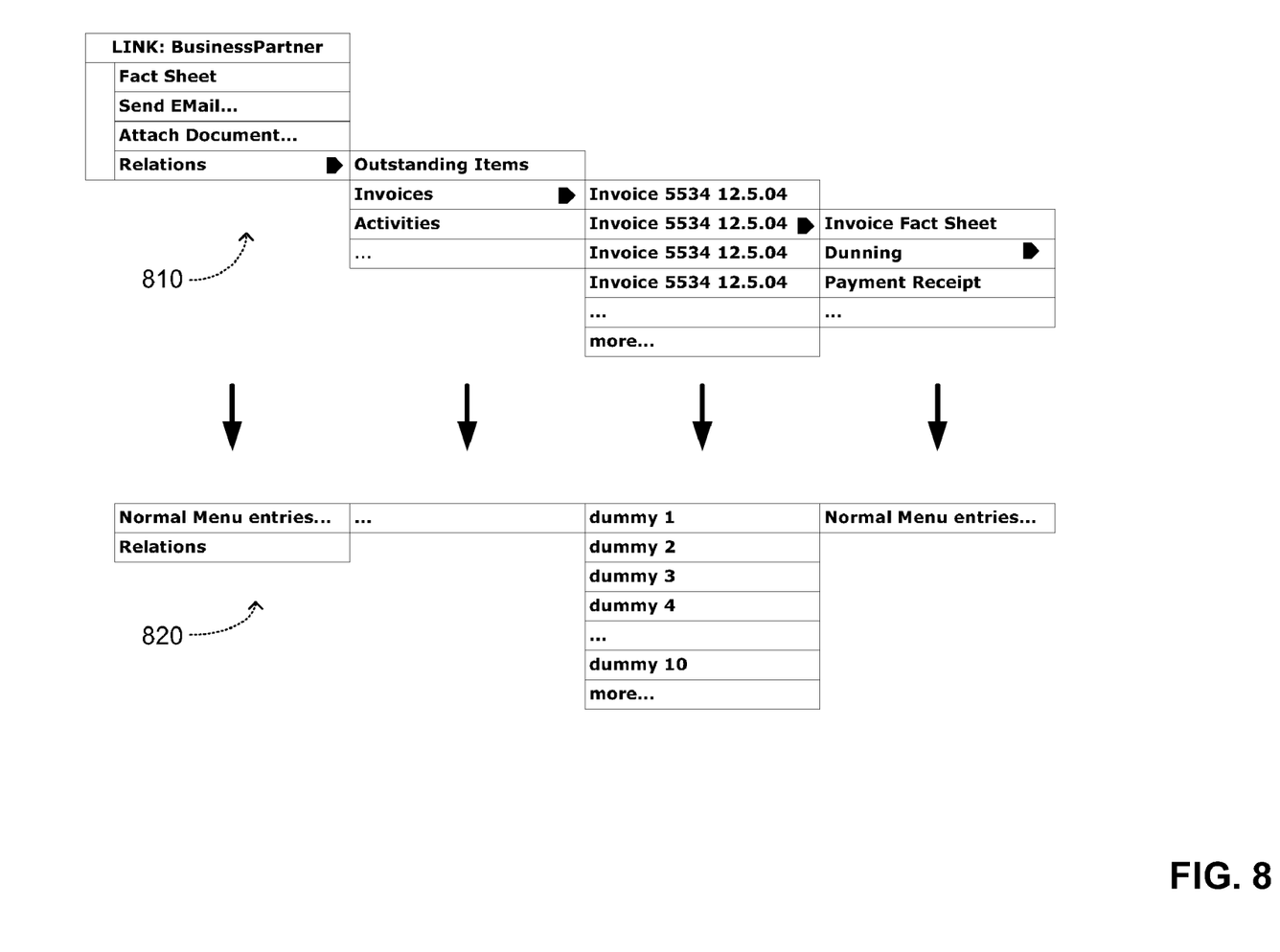
FIG. 8 is a simplified block diagram that illustrates an example of a menu tree displaying the relationship between a text element and data objects in a back-end system according to an embodiment of the present invention.

FIG. 8 is a simplified block diagram that illustrates an example of a menu tree displaying the relationship between a text element and data objects in a back-end system according to an embodiment of the present invention. FIG. 8 shows a menu tree 810 for a business partner data object, as may be viewed by a user of the front-end system, as well as a menu structure that may be used to create a menu tree. The user of the front end system may access the business partner data object by selecting a context link to a textual element displayed by an application program executing on the front-end system. In addition to functions that may be associated with this business partner data object (e.g., send email), FIG. 8 also shows relations between the business partner data object and other data objects, in this case outstanding items, invoices, and activities. FIG. 8 also shows the identity of a number of invoices at are associated with this data object, and for one of the invoices shows a number of data objects that are associated with that invoice (here, "invoice fact sheet", "dunning", and "payment receipt".)

In an embodiment, the front-end system may construct the menu 810 as follows. First, the front-end system may add a menu entry "relations" in addition to the normal menu entries for each data object type. Next, the front-end system may retrieve a dynamic list of linkable data object types. For each type, a list may be generated. Next, the front-end system may generate a fix list of dummy item menus, as shown in structure 820. When the appropriate context link is activated, the back-end attachment service may be called for relations. Finally, the front-end system may repaste the menu entries and actions for the specific data object type for each dummy entry.

Figure 9:
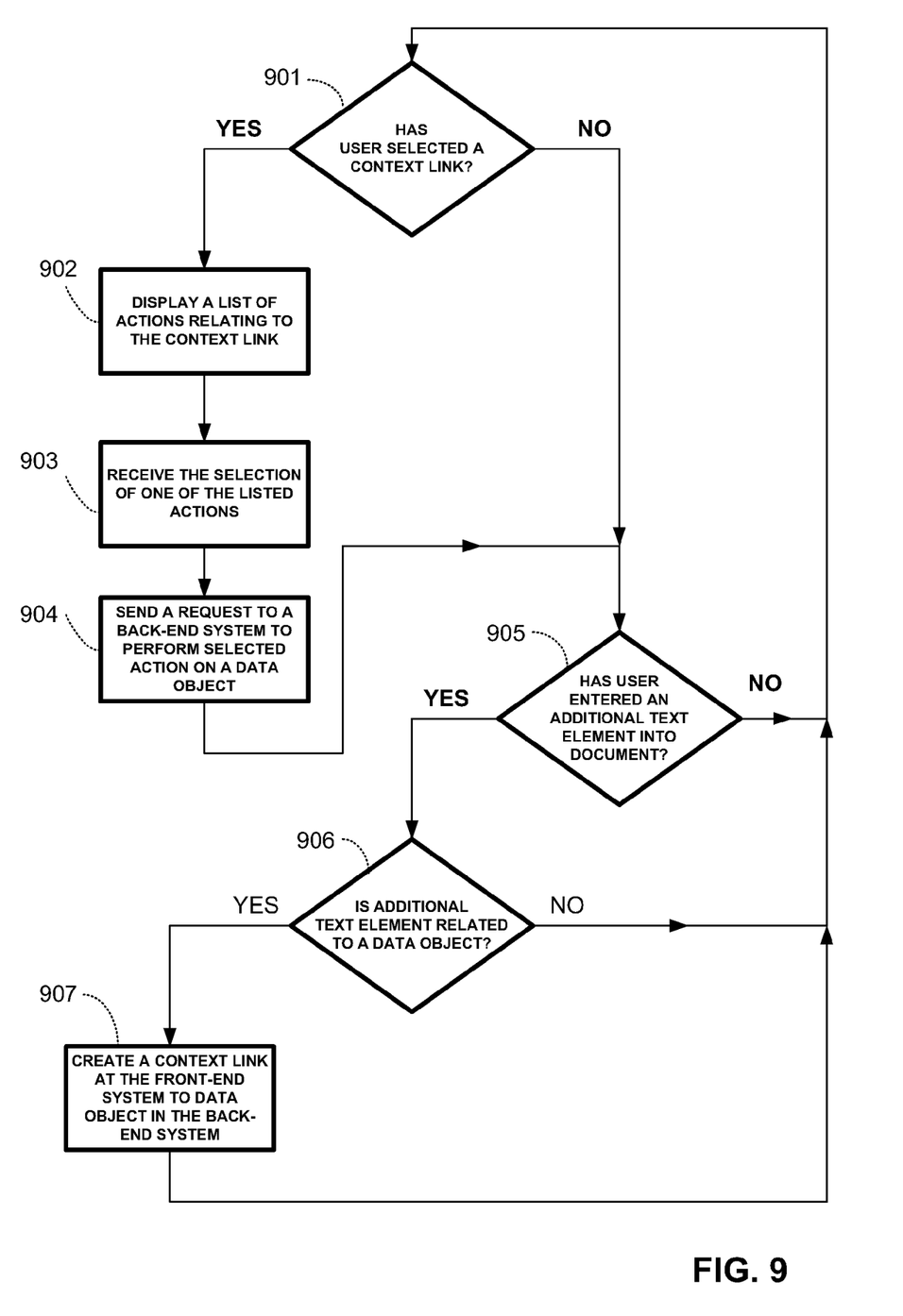
FIG. 9 is a flow diagram that illustrates a method of processing context links for a previously opened document according to an embodiment of the present invention.

FIG. 9 is a flow diagram that illustrates a method of processing context links for a previously opened document according to an embodiment of the present invention. This method may be performed on a document being operated on by an application program on the front-end system and for which context links were previously created, for example using a method discussed above. As shown in FIG. 9, it may be determined whether the application program received an indication that a user has selected a context link to a text element in the document (901). In an embodiment, the context link may be selected by selecting the text element. In response to the selection of the context link, the application program, with the support of the link program, may display a list of actions relating to the context link (902). The actions may include displaying data relations or performing functions on a related data element. The application program may then receive the selection of one of the listed actions (903) and in response to this a request may be sent to a back-end system to perform that selected action on a data object that is related to the selected text element (904). As further shown in FIG. 9, whether or not a context link was selected, the application program may determine if the user has entered an additional text element into the application program document (905). If an additional text element was entered, and that additional text element is related to a data object in the back-end system (906), then a context link may be created at the front-end system to a data object in the back-end system (907). In an embodiment, determining whether the additional text element is related to a data object in the back-end system may be performed as discussed above.

The above is a detailed discussion of the certain embodiments. It may be understood that the examples discussed are for illustration purposes only and are not intended to limit the configuration to that shown. For example, the order of the steps discussed may be varied as appropriate without departing from the scope of the invention. It is of course intended that the scope of the claims may cover other embodiments than those described above and their equivalents.

What is claimed is:

1. A method comprising:
    parsing an application program document at a front-end computer into a plurality of tokens;
    searching a database on a back-end server to determine if the tokens match data objects stored in the back-end server;
    if there is a match between a token and a matching data object in the back-end server, creating and storing in a buffer at the front-end computer a context link associating the token to the matching data object in the back-end server wherein determining the match and creating the context link comprise:
        if there is one hit for a token to match one data object type in the back-end server, creating and storing in the buffer at the front-end computer the context link associating the token to a single hit data object of the matching data object type in the back-end server;
        if there are multiple hits for a token to match one data object type in the back-end server:
            storing the token in a wait list for the matched data object type, the token being stored according to an order in which it is found in the application program document;
            determining if there are other tokens in the wait list for the matched data object type;
            combining the token with a preceding token in the waiting list to form a phrase;
            determining whether the phrase is related to a single data object on the back-end server; and
            upon determining the phrase is related to a single data object on the back-end server, creating and storing in the buffer at the front-end computer the context link associating the phrase to the single data object;
    responsive to the context link being selected, displaying in a menu structure with a list of actions including menu entries for each data object type and a relations entry for other data objects related to the matching data object;
    retrieving from the back-end server a dynamic list of linkable data object types for other data objects that are related to the matching data object;
    responsive to a selection of the relations entry, displaying a submenu with the list of linkable data object types for the data object;
    responsive to a selection of one linkable data object type from the dynamic list, displaying a next level of the submenu with a list of data objects of the selected linkable data object type associated with the matching data object;
    responsive to a selection of a data object from the list of data objects of the selected linkable data object type, displaying another level of the submenu with another list of actions associated with the selected data object; and
    responsive to a selection of one of the listed actions in the application program on the front-end computer, sending a request to a back-end server to perform the selected action on a data object that is related to the selected context link.

2. The method of claim 1, further comprising prior to the parsing, receiving a list of data object types at the front-end computer from the back-end server, wherein the list contains the data object types that are supported by the back-end server.

3. The method of claim 1, wherein the menu structure is populated with information from documents stored on the front-end computer based on a parameter conversion, wherein the parameter conversion converts tokens to different text for data object functions.

4. The method of claim 3, wherein the menu structure is received if textual information to be displayed with the menu is not available at that time.

5. The method of claim 1, wherein the searching comprises:
    searching a buffer in the front-end computer for the token; and
    if the token was not found in the buffer, requesting that the back-end server search for the token, wherein the search identifies a match between the token and a data object in the back-end server if the token was found in the buffer or in the back-end server.

6. The method of claim 1, wherein a phrase on the list is considered to be related to a single data object on the back-end server if that phrase was found only once for a data object type.

7. The method of claim 6, wherein a previous token is on this waiting list if that previous token was found more than once for that data object type and any tokens between that previous token and the token just added to the list were found more than once for that data object type.

8. The method of claim 7, wherein a token is removed from the waiting list for that data object type if the token it is not part of a phase that is found more than once for that data object type.

9. The method of claim 2, wherein the menu structure is populated with parameters to convert to menu text using the token.

10. The method of claim 9, wherein receiving a list of actions from the back-end system, further comprises:
    receiving a list of actions based on an authorization level of the user.

11. The method of claim 3, wherein the parameter conversion converts the token to a parameter for a function item of the menu.

12. A non-transitory computer-readable medium including instructions adapted to execute a method comprising:

parsing an application program document at a front-end computer into a plurality of tokens;

searching a database on a back-end server to determine if the tokens match data objects stored in the back-end server;

if there is a match between a token and a matching data object in the back-end server, creating and storing in a buffer at the front-end computer a context link associating the token to the matching data object in the back-end server, wherein determining the match and creating the context link comprise:

if there is one hit for a token to match one data object type in the back-end server, creating and storing in the buffer at the front-end computer the context link associating the token to a single hit data object of the matching data object type in the back-end server;

if there are multiple hits for a token to match one data object type in the back-end server:

storing the token in a wait list for the matched data object type, the token being stored according to an order in which it is found in the application program document;

determining if there are other tokens in the wait list for the matched data object type;

combining the token with a preceding token in the waiting list to form a phrase;

determining whether the phrase is related to a single data object on the back-end server; and upon determining the phrase is related to a single data object on the back-end server, creating and storing in the buffer at the front-end computer the context link associating the phrase to the single data object;

responsive to the context link being selected, displaying in a menu structure with a list of actions including menu entries for each data object type and a relations entry for other data objects related to the matching data object;

retrieving from the back-end server a dynamic list of linkable data object types for other data objects that are related to the matching data object;

responsive to a selection of the relations entry, displaying a submenu with the list of linkable data object types for the data object;

responsive to a selection of one linkable data object type from the dynamic list, displaying a next level of the submenu with a list of data objects of the selected linkable data object type associated with the matching data object;

responsive to a selection of a data object from the list of data objects of the selected linkable data object type, displaying another level of the submenu with another list of actions associated with the selected data object; and responsive to a selection of one of the listed actions in the application program on the front-end computer, sending a request to a back-end server to perform the selected action on a data object that is related to the selected context link.

13. The non-transitory computer-readable medium of claim 12, wherein the method further comprises prior to the parsing, receiving a list of data object types at the front-end computer from the back-end server, wherein the list contains the data object types that are supported by the back-end server.

14. The non-transitory computer-readable medium of claim 12, wherein the menu structure is populated with information from documents stored on the front-end computer based on a parameter conversion, wherein the parameter conversion converts tokens to different-text for data object functions.

15. The non-transitory computer-readable medium of claim 12, wherein the searching comprises:

searching a buffer in the front-end computer for the token; and if the token was not found in the buffer, requesting that the back-end server search for the token, wherein the search identifies a match between the token and a data object in the back-end server if the token was found in the buffer or in the back-end server.

16. The non-transitory computer-readable medium of claim 12, wherein a phrase on the list is considered to be related to a single data object on the back-end server if that phrase was found only once for a data object type.

17. The non-transitory computer-readable medium of claim 16, wherein a previous token is on this waiting list if that previous token was found more than once for that data object type and any tokens between that previous token and the token just added to the list were found more than once for that data object type.

18. The non-transitory computer-readable medium of claim 17, wherein a token is removed from the waiting list for that data object type if the token it is not part of a phase that is found more than once for that data object type.

19. A system, comprising:

a memory, a processor in communication with the memory, the processor configured to execute instructions for a method comprising:

parsing an application program document at a front-end computer into a plurality of tokens;

searching a database on a back-end server to determine if the tokens match data objects stored in the back-end server;

if there is a match between a token and a matching data object in the back-end server, creating and storing in a buffer at the front-end computer a context link associating the token to the matching data object in the back-end server, wherein determining the match and creating the context link comprise:

if there is one hit for a token to match one data object type in the back-end server, creating and storing in the buffer at the front-end computer the context link associating the token to a single hit data object of the matching data object type in the back-end server;

if there are multiple hits for a token to match one data object type in the back-end server:

storing the token in a wait list for the matched data object type, the token being stored according to an order in which it is found in the application program document;

determining if there are other tokens in the wait list for the matched data object type;

combining the token with a preceding token in the waiting list to form a phrase;

determining whether the phrase is related to a single data object on the back-end server; and upon determining the phrase is related to a single data object on the back-end server, creating and storing in the buffer at the front-end computer the context link associating the phrase to the single data object;

responsive to the context link being selected, displaying in a menu structure with a list of actions including menu entries for each data object type and a relations entry for other data objects related to the matching data object;

retrieving from the back-end server a dynamic list of linkable data object types for other data objects that are related to the matching data object;

responsive to a selection of the relations entry, displaying a submenu with the list of linkable data object types for the data object;

responsive to a selection of one linkable data object type from the dynamic list, displaying a next level of the submenu with a list of data objects of the selected linkable data object type associated with the matching data object;

responsive to a selection of a data object from the list of data objects of the selected linkable data object type, displaying another level of the submenu with another list of actions associated with the selected data object; and responsive to a selection of one of the listed actions in the application program on the front-end computer, sending a request to a back-end server to perform the selected action on a data object that is related to the selected context link.

20. The system of claim 19, wherein the method further comprises prior to the parsing, receiving a list of data object types at the front-end computer from the back-end server, wherein the list contains the data object types that are supported by the back-end server.

21. The system of claim 19, wherein the menu structure is populated with information from documents stored on the front-end computer based on a parameter conversion, wherein the parameter conversion converts tokens to different-text for data object functions.

22. The system of claim 19, wherein the searching comprises:

searching a buffer in the front-end computer for the token; and if the token was not found in the buffer, requesting that the back-end server search for the token, wherein the search identifies a match between the token and a data object in the back-end server if the token was found in the buffer or in the back-end server.

23. The system of claim 19, wherein a phrase on the list is considered to be related to a single data object on the back-end server if that phrase was found only once for a data object type.

24. The system of claim 23, wherein a previous token is on this waiting list if that previous token was found more than once for that data object type and any tokens between that previous token and the token just added to the list were found more than once for that data object type.

25. The system of claim 24, wherein a token is removed from the waiting list for that data object type if the token it is not part of a phase that is found more than once for that data object type.

* * * * *